United States Patent [19]

Gupta

[11] Patent Number: 4,662,445

[45] Date of Patent: May 5, 1987

[54] METHOD OF INCREASING OIL RECOVERY BY GRADING THE RATIO OF MONOSULFONATES AND DISULFONATES

[75] Inventor: Surendra P. Gupta, Tulsa, Okla.

[73] Assignee: Amoco Corporation, Chicago, Ill.

[21] Appl. No.: 797,366

[22] Filed: Nov. 12, 1985

[51] Int. Cl.$^4$ .............................................. E21B 43/22
[52] U.S. Cl. ..................................... 166/274; 166/273; 166/275
[58] Field of Search ....................... 166/273, 274, 275; 252/8.55 D

[56] References Cited

U.S. PATENT DOCUMENTS

| 4,537,253 | 8/1985 | Morita et al. | 166/274 |
| 4,544,033 | 10/1985 | Ukigai et al. | 166/274 |
| 4,549,607 | 10/1985 | Morita et al. | 166/274 |
| 4,555,351 | 11/1985 | Morita et al. | 166/274 X |
| 4,556,108 | 12/1985 | Morita et al. | 166/274 |

Primary Examiner—Stephen J. Novosad
Assistant Examiner—Thomas J. Odar
Attorney, Agent, or Firm—Scott H. Brown

[57] ABSTRACT

A method is disclosed for displacing hydrocarbon fluid within a subterranean formation by the introduction of an aqueous micellar fluid. In the method, the aqueous micellar fluid comprises a surfactant, from about 1 to about 30 wt. % sulfonate, and as the major constituent, water. The sulfonate further is comprised of a mixture of monosulfonate and disulfonate. At the start of the introduction of the aqueous micellar fluid, a monosulfonate-rich sulfonate mixture is utilized and at the end of the introduction, a disulfonate-rich mixture is utilized. Such grading or adjusting or mono- to disulfonates is used to increase the effectiveness of the micellar fluid and can occur throughout the introduction process either linearly or exponentially with respect to time, or in block slugs in the micellar fluid alone, a phase control fluid alone, or across both.

11 Claims, 7 Drawing Figures

METHOD OF INCREASING OIL RECOVERY BY GRADING THE RATIO OF MONOSULFONATES AND DISULFONATES

BACKGROUND OF THE INVENTION

1. Field of the Invention

The present invention relates to a method of increasing oil recovery by injecting an aqueous micellar fluid into a subterranean formation and, more particularly, to such a method which utilizes mixtures of mono-and disulfonates.

2. Setting of the Invention

After free flowing oil has been removed from an oil-bearing subterranean formation, a significant quantity of oil, as much as 50% of the original in-place oil, often times remains. This remaining oil is difficult to recover but certain tertiary or enhanced oil recovery (EOR) methods have proven to be effective. One method of tertiary recovery is the injection of fluids containing surfactants miscible with oil followed by a polymer thickened fluid into the reservoir to push or "sweep" residual or tertiary oil from an injection well to a production well. The micellar fluid is effective because of its ability to reduce or eliminate the oil retaining forces caused primarily by high interfacial tension (IFT). The polymer thickened fluid, usually called a mobility control fluid bank aids in maintaining the mobility and integrity of the micellar fluid in the reservoir.

The micellar fluid can be used alone or with a phase control fluid, containing a cosurfactant, usually a mixture of either one or two cosurfactants, such ethoxylated alcohols, to stabilize the micellar fluid and thereby increase its effectiveness and useful life as it moves through the reservoir. This type of micellar fluid system has been described in "Salinity and Hardness Tolerance Microemulsion Formations," Maini and Batycky, Petroleum Institute's Report RR-43, May, 1980.

The phase behavior of the surfactants and cosurfactants used has been extensively used to identify the optimum microemulsion formulation for the micellar fluids. The equilibration of the surfactant-oil-brine system has been shown to produce generally a lower-, upper-, and middle-phase microemulsion. It has been commonly thought to use the micellar systems that develop a middle phase microemulsion because minimal interfacial tensions (IFT) between both oil and brine with the surfactants can be obtained.

As beneficial as crude oil and/or vacuum gas oil sulfonate or other petroleum or synthetic sulfonate systems are in a micellar flooding operation, certain sulfonate components, such as the quasi-monosulfonates tend to stay together in a middle or upper phase microemulsion and the quasi disulfonates tend to stay in the water phase and this behavior can be detrimental to the micellar fluid performance. The inventor hereof knows of no reference which discloses or suggests the concept of varying the sulfonate mixture in the micellar fluid and/or the phase control fluid for optimum oil recovery. Further, the inventor hereof know of no reference which discloses or suggests utilizing a monosulfonate-rich mixture at the beginning of the introduction of the micellar fluid and/or utilizing a disulfonate-rich mixture at the trailing edge of the micellar fluid or in the phase control bank to overcome the above-described deficiencies.

SUMMARY OF THE INVENTION

The present invention provides a method of displacing hydrocarbon fluid within a subterranean formation by the introduction of an aqueous micellar solution. The micellar solution can be followed by the introduction of a mobility control fluid or by both a phase control fluid and the mobility control fluid. The micellar solution generally comprises a surfactant, from about 1 to about 30 wt% sulfonate and, as a major constituent, water. The sulfonate utilized further comprises a mixture of monosulfonate and disulfonate formed from crude oil, vacuum gas oil or from other petroleum feedstocks or synthetic components. In the introduction of the aqueous micellar solution, the sulfonate mixture is first monosulfonate-rich and at the end of the introduction, the sulfonate mixture is disulfonate-rich. One such method in accordance with the present invention is to grade or adjust either linearly or exponentially with respect to time, or in blocks or steps the ratio or the amount of monosulfonate to disulfonate in the micellar fluid alone, the phase control fluid alone, or across the micellar fluid and the phase control fluid.

By utilizing the above described method, the amount of cosurfactant, which is the most expensive chemical utilized in micellar fluid, can be reduced thereby reducing the overall cost of the micellar operation; the phase control bank can even be eliminated in some situations thereby saving the cost of the chemicals and introduction costs; and the micellar fluid size itself can be increased without any additional cost because the sulfonates are less expensive than the cosurfactants normally utilized.

DETAILED DESCRIPTION OF THE PREFERRED EMBODIMENT

Figure 1:
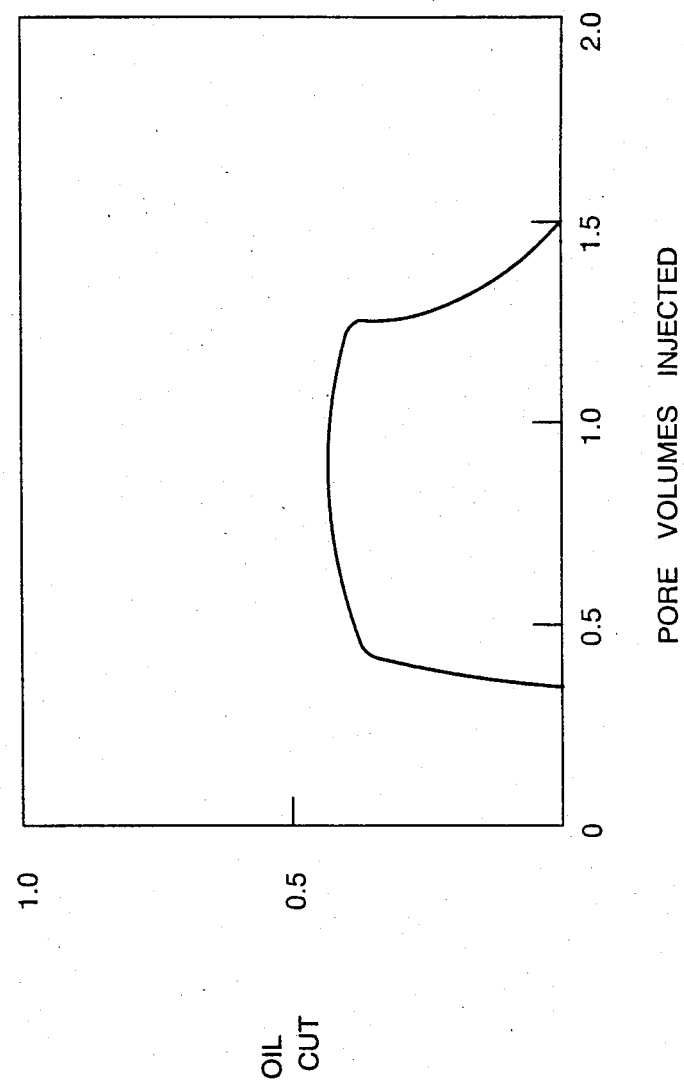
FIG. 1 is a graphical representation of the pore volumes injected in a core versus the oil cuts produced.

A method is disclosed for displacing hydrocarbon fluid within a subterranean formation from an injection well towards a production well by the introduction of an aqueous micellar solution. The micellar solution comprises a surfactant, from about 1 to about 30 wt % sulfonate, and, as a major constituent, water. The sulfonate utilized is comprised of a mixture of monosulfonate and disulfonate. At the start of the introduction of the micellar solution, a monosulfonate-rich mixture is utilized and at the end of the introduction, a disulfonate-rich mixture is utilized.

As is well known to those skilled in the art, in an enhanced or tertiary oil recovery method, an aqueous micellar solution is injected through an injection well into a subterranean hydrocarbon-bearing formation to push or sweep any remaining oil towards one or more production wells traversing the subterranean oil-bearing formation. The aqueous micellar solution is injected first and is followed by a phase control fluid and then by a mobility control fluid or just the mobility control, as previously discussed.

The three primary chemical components used in a micellar polymer system are sulfonates, cosurfactants, and the polymer. If a phase control fluid is used, cosurfactants are required. For example, a three acre micellar pilot in a U.S. Rocky Mountain reservoir can require about 2.25 MM pounds of sulfonate, 2.7 MM pounds of cosurfactant, and approximately 346,700 lbs of polymer. The estimated cost of an in-field crude oil sulfonate production on a large scale basis is about 20¢ to 30¢/lb of active sulfonate. The estimated cost of purchasing cosurfactant is 60¢ to 70¢/lb and polymer is about $1.50/lb (Fall 1985 prices). Thus, it can be seen that the cosurfactant is the most expensive chemical and considerably effects the economics of a fieldwide project. The present invention has been contemplated to either eliminate the need of the cosurfactant by eliminating the need for the phase control bank or to greatly reduce the cost of the phase control bank by greatly reducing the quantity of cosurfactant needed for the same beneficial results.

One method of achieving the above beneficial and nonobvious results is by taking advantage of the differences in phase behaviors of the components of the sulfonate used in the micellar system. The crude oil sulfonates used in the present invention contain at least two pseudocomponents, usually an oil-moving quasi-monosulfonate and an oil solubilizing quasi-disulfonate. A more detailed description of these two types of sulfonates and their behaviors is described in Chan/Gupta paper, SPEJ, August 1984, p. 435–446. A quantity of crude oil sulfonate usually contains about 10 to about 25 wt % active sulfonate, which is further made up from about 40% to about 70% mono- and from about 60% to about 30% disulfonate. fonate. For example, a crude oil sulfonate is 18.03 wt% active sulfonate and it contains about 54.67% quasi-monosulfonate and about 45.33 wt % quasi-disulfonate.

Several tests simulated by a compositional model for displacement in Berea sandstone cores demonstrate that varying the amount of mono- and disulfonate can be used to improve the oil recovery of a micellar system. It has been found that quasi-monosulfonate and some cosurfactants tend to accumulate in an undesired upper or a desired middle phase microemulsion. It is thought that this accumulation is due to the formation of mixed micelles. The quasi-disulfonate component predominantly tends to remain in a water phase; however, a fraction of the quasi-disulfonate partitions into the upper or middle phase microemulsion. The fractionization or separation of the quasi-mono and quasi-disulfonates from the injected micellar fluid can be detrimental to the oil displacement efficiency of the micellar system. The elimination of the use of cosurfactant(s) or greatly reducing the quantity of cosurfactant used for purposes of reduction in cost, as well as the elimination of the detrimental upper microemulsions is greatly desired. One of the purposes of the present invention is to use the quasi-mono and quasi-disulfonates in varying quantities to effectively be a replacement for cosurfactant within the micellar fluid.

A phase control bank between the aqueous micellar fluid and the mobility control fluid usually utilizes a high HLB cosurfactant which is used to increase the hydrophilicity of the fluid system. A primary function of the phase control fluid is to generate the phase transition to a lower phase, thereby insuring miscible displacement of the expensive micellar fluid components. As stated above, a quasi-disulfonate can also be used to increase the hydrophilicity of the micellar fluid system. Therefore, a phase control fluid containing low cost crude oil or vacuum oil sulfonate containing a high quantity of quasi-disulfonate can equally be as effective. A disulfonate that contains a greater amount of solubilizing quasi-disulfonate than quasi-monosulfonate, i.e., being disulfonate-rich is easily manufactured. This type of crude oil sulfonate can be manufactured by increasing the sulfonation level or reducing the topping level or by both during the refining, as is well known to those skilled in the art.

It should be noted the hydrophilicity of the micellar fluid at the rear of the slug or the phase control fluid can also be increased without increasing the amount of quasi-disulfonate but by adjusting the topping or sulfonation process such that equivalent weight of quasi-disulfonate is decreased with minimal effect of oil-moving quasi-monosulfonate.

An additional benefit of using a quasi-disulfonate-rich fluid in the phase control fluid is that by using the quasi-disulfonate in the phase control fluid, the risk of separation of the quasi-mono and quasi-disulfonates during the displacement processes is greatly reduced.

In many situations under high salinity and high hardness formation conditions, it is desirable to increase the effective HLB of the micellar fluid system to prevent the generation of an upper phase microemulsion. This HLB adjustment can be achieved by increasing the HLB of the cosurfactant, by increasing the amount of cosurfactant, or by using simple water soluble alcohol. Some of the above methods are expensive and can result in increased interfacial tension. However, by increasing the amount of oil solubilizing quasi-disulfonate fluid in the micellar system, the desired phase transition from middle phase to lower phase can be generated. This, of course, requires that the quality and the quantity of oil-moving quasi-monosulfonate present in the micellar fluid meet the specifications for generating a high solubilization parameter. It should be also noted that the quasi-disulfonate within a certain broad range does not increase interfacial tension with the oil. This is described in Penn State Research, SPEJ, February, 1983, p. 73.

The method of the present invention described herein eliminates the need to increase the amount of cosurfactant, such as ethoxylated alcohol, in the micellar fluid to obtain the desired phase behavior. Also, it should be understood that in some situations a cosurfactant will be desired, therefore utilizing the adjustment of the effective components of the sulfonate (the quasi-di or quasi-monosulfonate) will accomplish the same objective above in combination with the cosurfactant.

The inventor hereof found that the quasi-monosulfonate fluid is needed for good oil displacement efficiency, therefore it cannot be totally eliminated, and the quasi-disulfonate fluid is needed for good oil solubility, therefore it should not be totally eliminated. However, the ratio of quasi-mono to quasi-disulfonate can be "graded" or adjusted, exponentially or linearly with regard to time, or in block slugs from a high ratio at the leading edge of the micellar fluid to a low ratio or inverse ratio at the trailing edge. Basically, one of the objectives is to increase the hydrophilicity of the micellar fluid system from the front end of the micellar fluid to the rear end of the micellar fluid. It should be noted that the grading or adjustment from a monosulfonate-rich to a disulfonate-rich fluid system can be across only the micellar fluid, across the phase control fluid, or across both, with or without the use of cosurfactants.

In one utilization of the method of the present invention, an aqueous micellar fluid includes from about 1 to about 30 wt % sulfonate and preferably 3 to about 10 wt % sulfonate, with a major constituent being water, i.e., over 50 wt %. Also, the aqueous micellar solution can contain from 0 to about 20 wt % and preferably about 1% to about 5% cosurfactant. Further, the proportion of monosulfonate to disulfonate (to obtain the desired phase behavior) is graded or adjusted, as described above. The amount of monosulfonate in the sulfonate fluid is decreased so that at the beginning of the introduction step, a monosulfonate-rich mixture is utilized and at the end of the introduction step a disulfonate-rich mixture is utilized.

Figure 2:
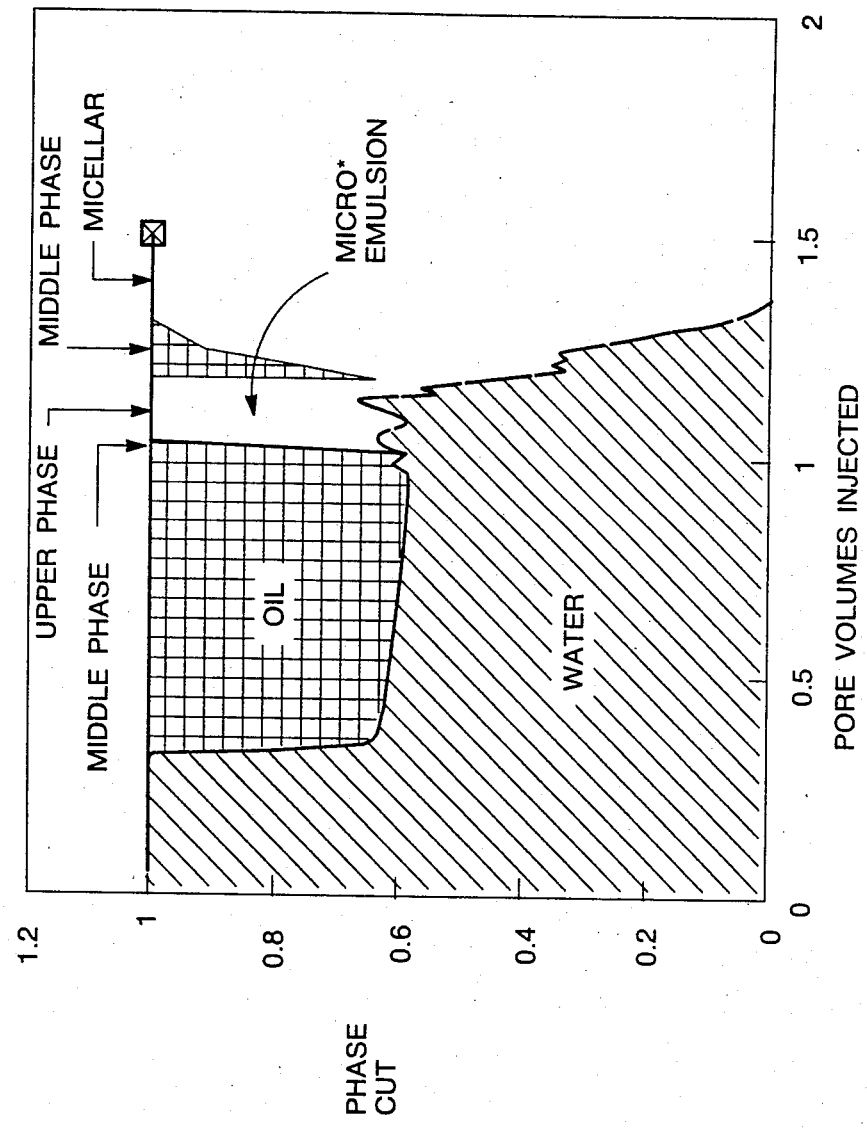
FIG. 2 a graphical representation of the pore volumes injected in a core versus the phase cut of the oil produced therefrom.
Figure 3:
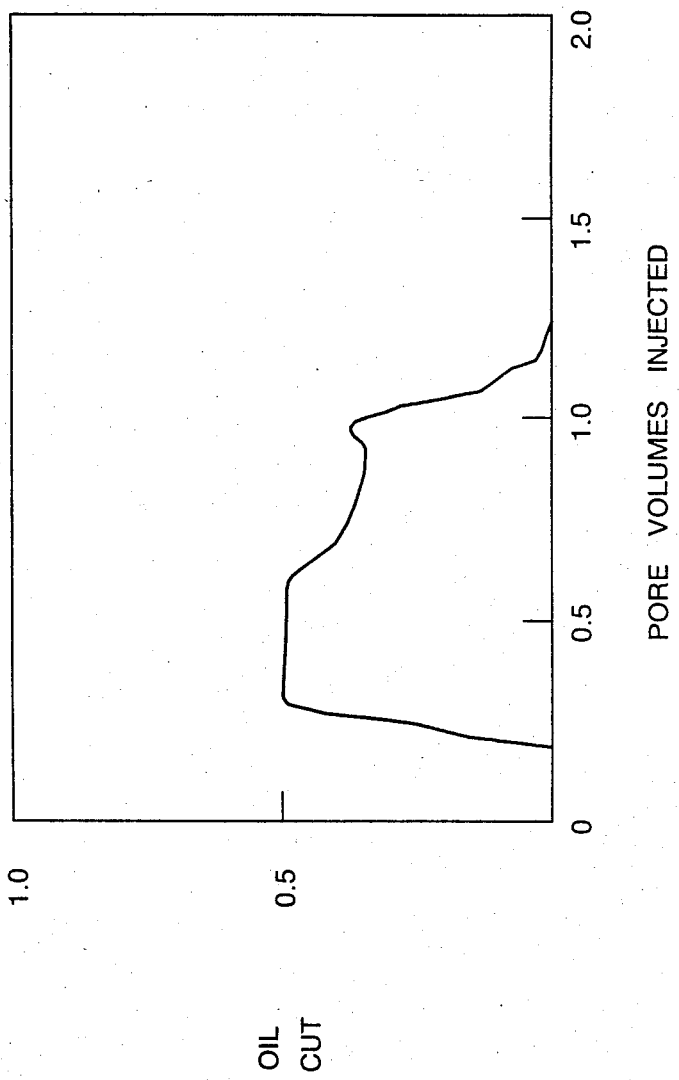
FIG. 3 is graphical representation of the pore volumes injected in another core versus the oil cuts produced.

The effectiveness of the present invention, i.e., grading or adjusting the ratio of quasi-mono to quasi-disulfonate in a micellar fluid, has been shown by mathematically simulated tests utilizing Berea sandstone cores. In one example, a micellar fluid of which 2.5 wt % was quasi-monosulfonate, and 2.25 wt % was quasi-disulfonate and about 3.0 wt % nonionic cosurfactant (ethoxylated alcohol) is injected into a Berea sandstone core. As shown in FIG. 1, the oil recovery is very good. However, generated phase behavior (FIG. 2) in the core effluent changes from middle to upper, and then back to middle phase microemulsions. It is thought that this is due to the changing calcium ion concentration generated by the ion exchange process within the Berea sandstone core. In another test, a 0.14 PV slug of the above described micellar fluid was followed by a phase control bank, containing 2.25% quasi-disulfonate. The results shown in FIG. 3 indicate very good oil recovery, i.e., about 5% Sof because desired phase transition was generated by the phase control bank.

Figure 4:
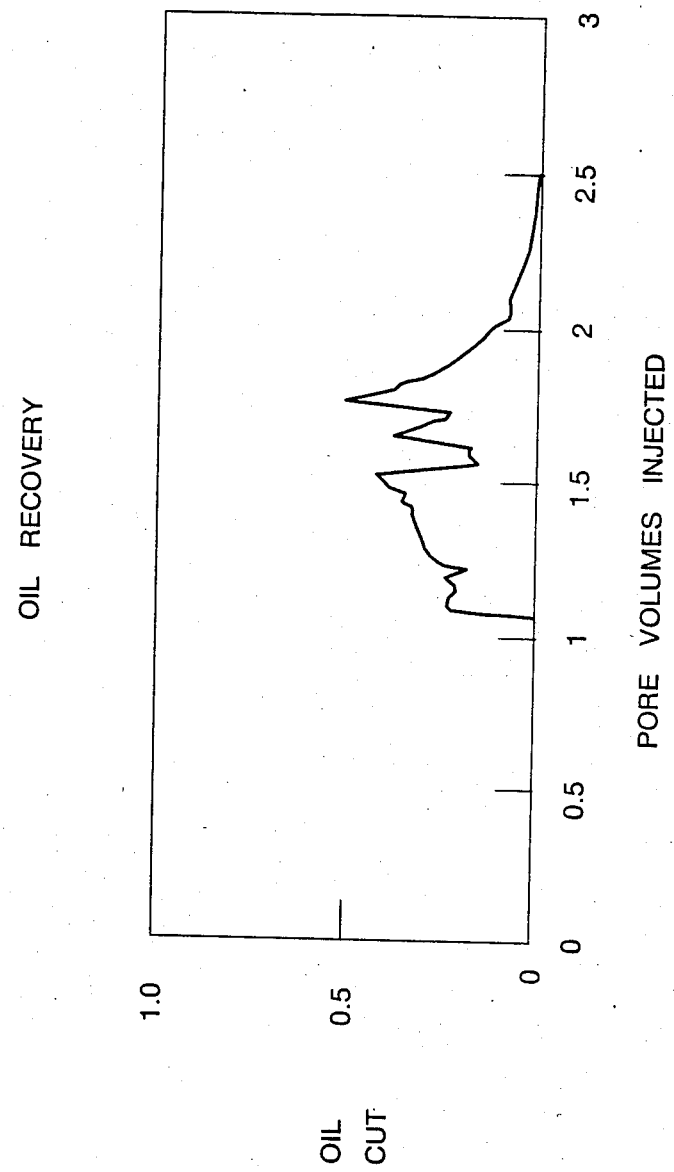
FIG. 4 a graphical representation of the pore volumes injected in another sandstone core versus the oil cuts produced.
Figure 5:
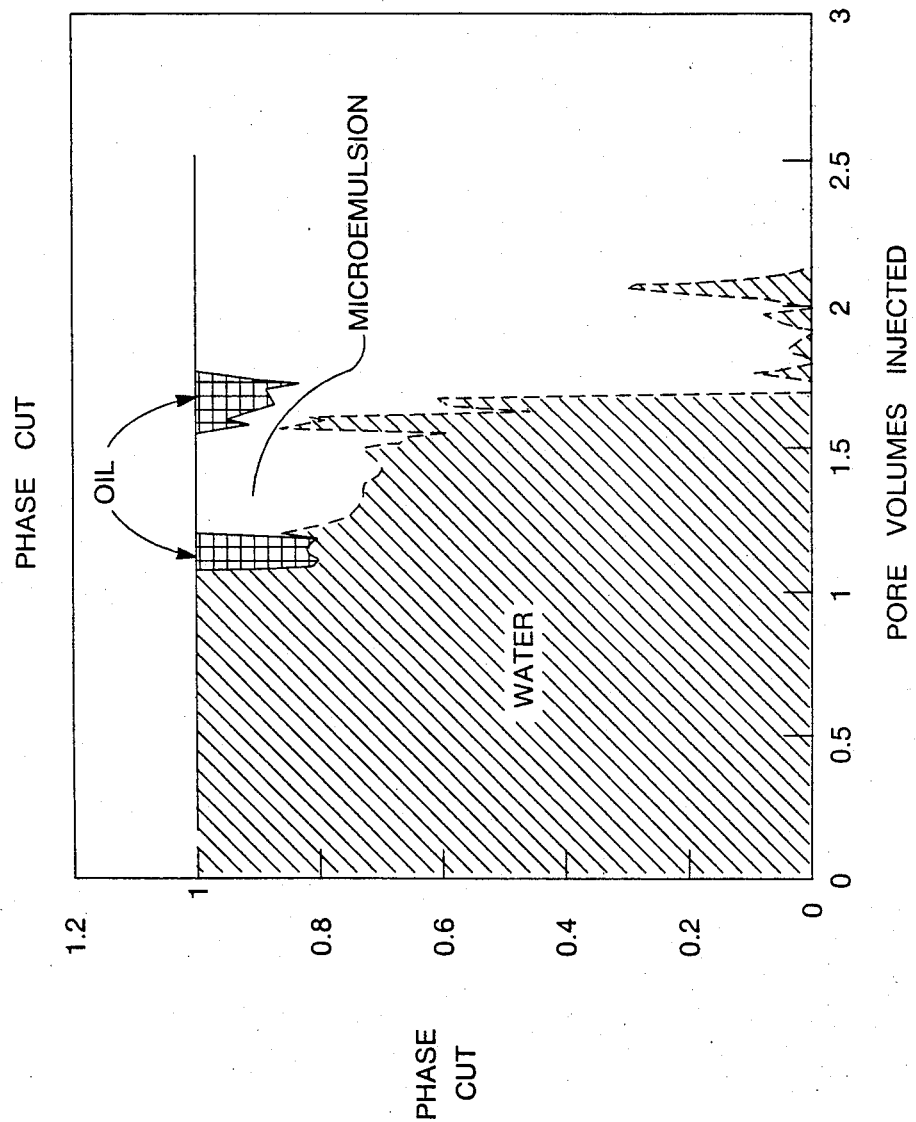
FIG. 5 is a graphical representation of the pore volumes injected into the sandstone core versus the phase cut of the therefrom.
Figure 6:
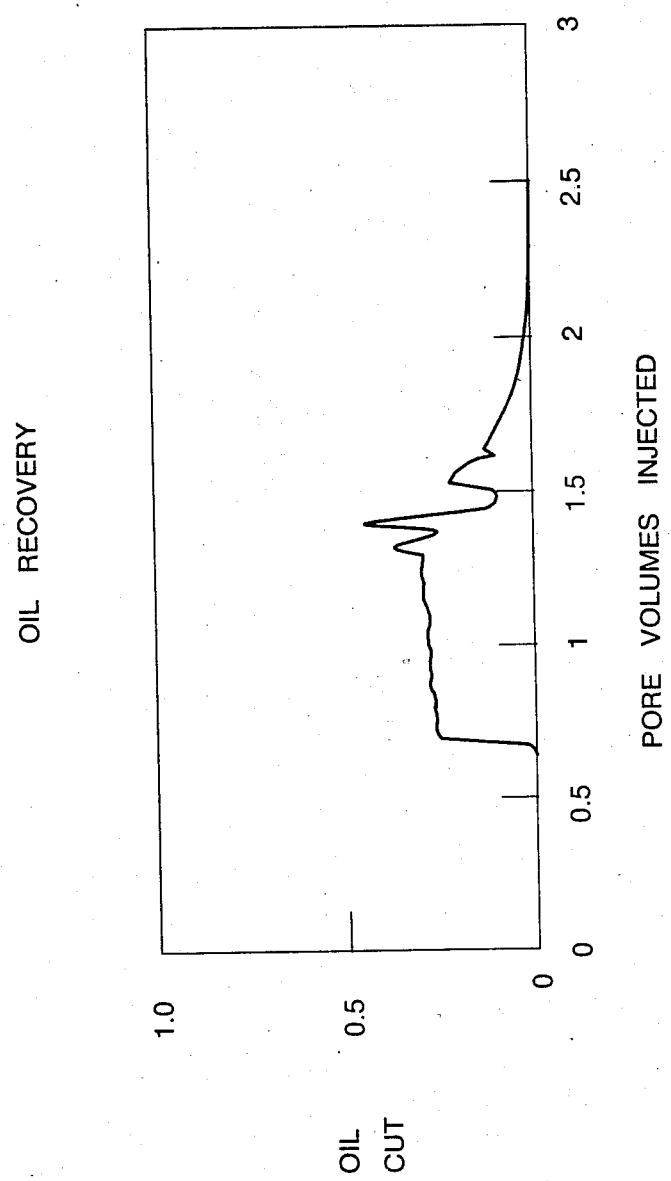
FIG. 6 is a graphical representation of the pore volumes into a third core versus the oil cut produced.
Figure 7:
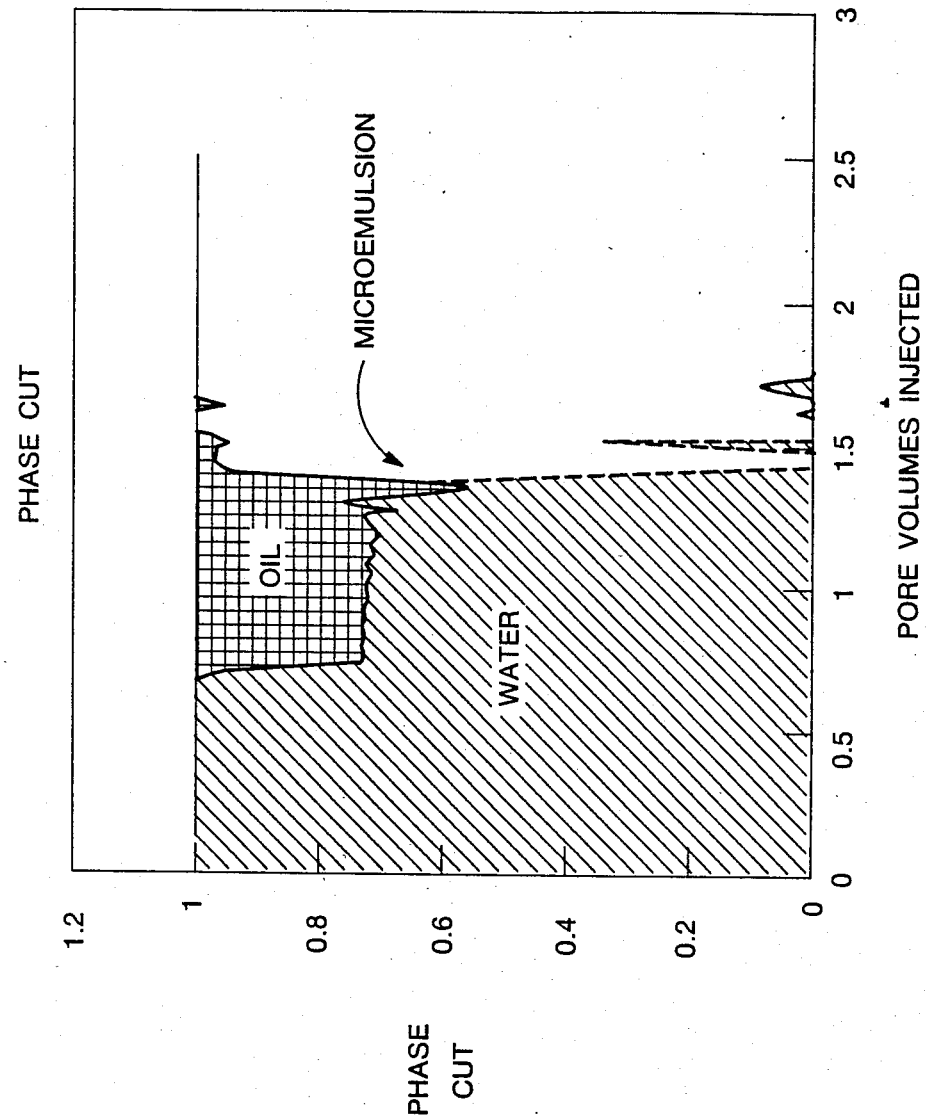
FIG. 7 is a graphical representation of the pore volumes injected into the third core versus the phase cut of the oil produced therefrom.

In another mathematically simulated example, the same micellar fluid as the first example (FIGS. 1 and 2) is injected into a second type of sandstone core. The results shown in FIG. 4 show late oil breakthrough to low oil cuts and considerable trailing. This type of performance occurs in certain types of sandstone rock because the cation exchange capacity of the rock shown here is ten times greater than the Berea sandstone rock shown in the above example. The higher cation exchange capacity results in high calcium ion concentration by the ion exchange process and creates adverse conditions for oil displacement. As shown in FIG. 5, the phase behavior of the produced fluid is essentially upper phase with a small region where middle phase production occurs. In brief, the generated microemulsion is too oil soluable and does not propagate efficiently. However, in accordance with the present invention, the above example was rerun using the above-described grading or adjusting the amounts of quasi-mono to quasi-disulfonate to obtain the correct phase behavior. As shown in FIGS. 6 and 7, improved performance is achieved by increasing the quasi-disulfonate in the micellar fluid from 2.25 wt % to 4.5 wt %, thereby decreasing the oil solubility of the quasi-monosulfonate. Great improvements in early oil breakthrough, higher oil cuts and less trailing are shown in FIG. 6. Furthermore, the desired phase behavior is generated, i.e., a minimum region with upper phase microemulsion production (FIG. 7).

Wherein the present invention has been described in particular relation to the drawings attached hereto, it should be understood that other and further modifications apart from those shown or suggested herein may be made within the scope and spirit of the present invention.

What is claimed is

1. A method of displacing hydrocarbon fluid within a subterranean formation by the introduction of an aqueous micellar fluid, comprising:
   introducing into the reservoir are aqueous micellar fluid comprising a surfactant, from about 1 to about 30 wt % sulfonate, and, as a major constituent, water, the sulfonate further comprising a mixture of monosulfonate and disulfonate, wherein at the start of the introduction a monosulfonate-rich mixture is utilized and at the end of the introduction, a disulfonate-rich mixture is utilized.

2. The method of claim 1 wherein throughout the introduction the amount of monosulfonate in the mixture is decreased while the amount of disulfonate in the mixture is increased.

3. The method of claim 2 wherein the ratio of disulfonate:monosulfonate is increased exponentially or linearly (with respect to time).

4. The method of claim 1 wherein the aqueous micellar fluid includes from about 3 to about 10 wt % sulfonate.

5. The method of claim 2 wherein the ratio of disulfonate to monosulfonate is increased in steps with respect to time.

6. The method of claim 1 and including introducing a phase control fluid into the subterranean formation after the micellar fluid.

7. The method of claim 6 wherein the phase control fluid comprises, as a major constituent, water and a mixture of monosulfonate and disulfonate, wherein at the start of the introduction of the micellar fluid a monosulfonate-rich mixture is utilized and at the end of the introduction of the phase control fluid, a disulfonate-rich mixture is utilized.

8. The method of claim 7 wherein the phase control fluid further includes a cosurfactant.

9. The method of claim 1 and including introducing a mobility control fluid into the subterranean formation after the micellar fluid.

10. The method of claim 6 and including introducing a mobility control fluid into the subterranean formation after the phase control fluid.

11. A method of displacing hydrocarbon fluids within a subterranean formation, comprising:
   (a) introducing into the subterranean formation a micellar fluid comprising, as a major constituent, water, surfactant or sulfonate;
   (b) introducing into the subterranean formation a phase control fluid comprising, as a major constituent, water, and a mixture of monosulfonate and disulfonate, wherein at the start of the introduction the phase control fluid, a monosulfonate-rich mixture is utilized and at the end of the introduction of phase control fluid, a disulfonate-rich mixture is utilized; and
   (c) introducing into the subterranean formation a mobility control fluid.

* * * * *